July 12, 1938.  W. FULDA ET AL  2,123,650
PROCESS FOR THE RECOVERY OF ALUMINUM COMPOUNDS
FROM ALUMINIFEROUS MINERALS
Filed Oct. 13, 1934
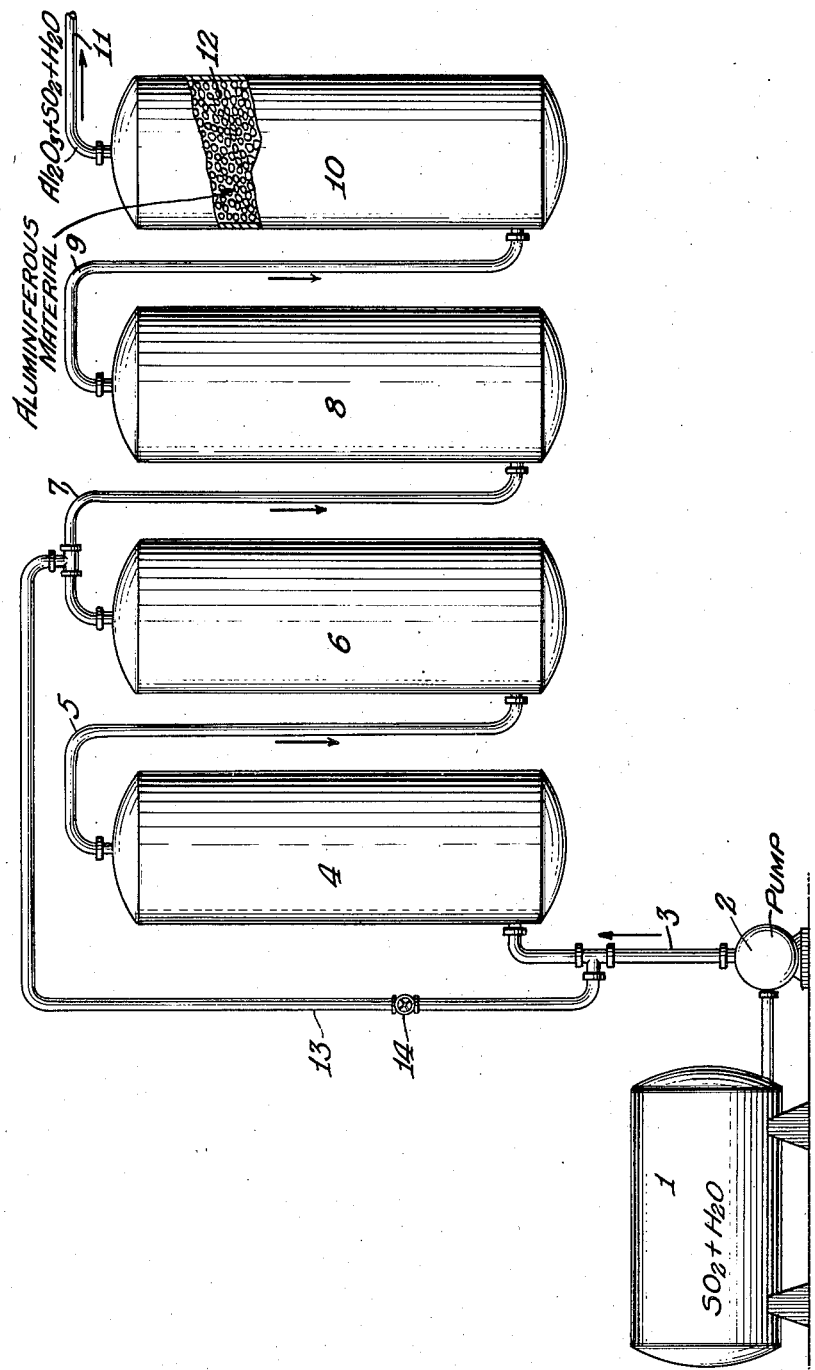
Inventor
Wilhelm Fulda, Erich Wiedbrauck and
Karl Büche
By 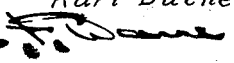
Attorney Patented July 12, 1938

2,123,650

UNITED STATES PATENT OFFICE 2,123,650

PROCESS FOR THE RECOVERY OF ALUMINUM COMPOUNDS FROM ALUMINIFEROUS MINERALS

Wilhelm Fulda, Lautawerk, and Erich Wiedbrauck and Karl Büche, Essen, Germany, assignors to firm Th. Goldschmidt A.-G., Essen-Ruhr, Germany Application October 13, 1934, Serial No. 748,262
In Germany October 14, 1933

7 Claims. (Cl. 23—129)

This invention relates to a process for the recovery of aluminum compounds from aluminiferous minerals such as clays, kaolins and the like which are difficult to decompose.

Processes for the recovery of aluminum compounds from aluminiferous minerals such as clays, kaolins and the like which are difficult to decompose by treatment with aqueous $SO_2$, are known, said processes being carried out at elevated temperature with or without the application of pressure.

In these processes, when decomposing the aluminiferous materials, a stirring apparatus is used in order to ensure the aqueous $SO_2$ being brought in adequate contact with the material under treatment. This decomposition process is attended with considerable expenditure of power and labour, whilst moreover, the filtration of the fine residue resulting from the decomposition process offers difficulties.

It is the object of the present invention to improve the efficacy of the decomposition by treating the starting material while at rest with a flowing stream of acid. In first attempting to attain this object it was found that the starting material tends to cohere in the form of balls so that the flow of acid progressively diminishes and finally ceases entirely. In this manner large quantities of sulphurous acid were retained in the charge and wasted so far as the decomposition is concerned, the yield of alumina being consequently very poor. Hence, it was hitherto impossible to dispense with stirring mechanism in decomposing such aluminiferous raw materials.

Applicants have discovered that the reason for the diminishing rate of flow of the decomposing acid in operating with a compact bed of charge material was to be found in the deposition of basic aluminum sulphites. These obstructed the pores and interstitial spaces in the charge material and thus impeded satisfactory penetration by the sulphurous acid. This deposition of basic aluminum sulphite had therefore to be prevented.

This is effected in accordance with the present invention by passing the aqueous sulphurous acid through a quiescent bed of charge material at such a rate that it remains in contact therewith for only a short time. In such circumstances no opportunity is afforded for the formation of liquors that are already very high in alumina. Such liquors are very unstable and deposit basic aluminum sulphites even during the decomposition process. The procedure of the present invention consists in operating in such a manner that the alumina content in the decomposition liquor is always below the concentration range in which the deposition of the basic aluminum sulphite occurs. The concentration that is desirable in view of the further treatment of the liquor is attained only at the end of the working operation. The process of the present invention may also be performed on the counterflow principle, in which case the decomposition period can be prolonged, inasmuch as the fresh sulphurous acid solution comes in contact at first with charge material that is already nearly exhausted, so that the liquors formed at the outset are merely low in alumina and become concentrated only towards the end of the operation. Consequently, no opportunity is afforded for the deposition of the basic aluminum sulphites during the decomposition.

The working temperature, the alumina content of the decomposing liquor, and especially also the sulphur dioxide content of the latter, play an important part in the decomposition process of the present invention. However, the maintenance of these factors approximately within the limits prescribed for the hereinbefore mentioned known processes, provide a guarantee for the satisfactory performance of the process and the attainment of a sufficient yield. Thus, for example, it is advantageous to operate at a temperature of about 50 to 80° C. with a decomposition liquor containing about 30 to 80 grms. of $Al_2O_3$ per litre, and a surplus $SO_2$ content of about 15 to 40 parts per 100 parts of water.

If, in carrying out the present process, several decomposition vessels be arranged in series and the operation conducted on the counterflow principle, the working temperature may be highest in the first vessel and gradually fall towards the last. In this manner, solutions high in $Al_2O_3$ are obtained which are not exposed to the risk of deposition of basic aluminum sulphites. An intermediate saturation of the decomposing liquor with $SO_2$ may also be performed, in order to increase the stability of said liquor. Moreover, it has been ascertained that the formation of liquors high in alumina results in an extensive separation of the alumina from the silica.

In the accompanying drawing we have shown more or less diagrammatically an organization of apparatus elements which can be employed in the process of our invention, for example, when operating on the counter-current principle. In this showing the figure shows four tanks designated by reference numerals 4, 6, 8 and 10, each containing an enclosed body of aluminiferous material, as indicated at 12, for tank 10. The tanks are interconnected by means of the pipes 5, 7 and 9, these pipes leading from the top of one tank to the bottom of the one next succeeding. Element 1 represents a tank for holding the leaching solution of our invention, namely an aqueous solution of sulfur dioxide.

In operation the solution from tank 1 is pumped by means of pump 2 into the bottom of tank 4 which contains aluminiferous material which has been subjected to the action of the leaching liquor for the longest period. The leaching liquor rises through the aluminiferous material in the tank 4 and passes out at the top by means of pipe 5 which leads it into the bottom of the second tank 6, this tank containing aluminiferous material which has been subjected to the action of the leaching liquor for the next longest period. The liquor again rises through tank 6 and passes out at the top through pipe 7, passing in the same manner through tanks 8 and 10. The pregnant liquor containing $Al_2O_3+SO_2+H_2O$ finally leaves the system by means of the pipe 11. Tank 10 contains fresh aluminiferous material. After having been operated in the described manner until the aluminiferous material in tank 4 has been completely leached, this tank is removed from the system. A freshly filled tank is then inserted to the right of tank 10 and the process is repeated. If desired some of the fresh leach liquor can be by-passed through the pipe 13 into tank 8, the flow through pipe 13 being controlled by means of valve 14.

The chemical equation representing the reaction which takes place in our process between the leaching liquor and the aluminiferous materials can be represented as follows:

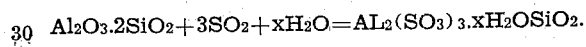

$$Al_2O_3 \cdot 2SiO_2 + 3SO_2 + xH_2O = Al_2(SO_3)_3 \cdot xH_2OSiO_2.$$

The following specific examples represent practical operating embodiments of our invention.

*Example 1*

60 litres of a solution of 20 kgs. of $SO_2$ in 100 litres of water are passed during a period of 52 hours, at a temperature of 65° C. and under a pressure of 6 atmospheres, through three serially disposed reaction towers, with a total charge of 8,1 kgs. of pre-calcined clay (containing 3,04 kgs. of alumina). 80% of the alumina present passes into solution, a liquor with a mean content of 40 grms. of $Al_2O_3$ being obtained. The highly siliceous residue, which is preferably leached or steamed in the decomposition vessel itself, contains merely traces of sulphurous acid.

If it be desired to perform this process in a continuous manner and on the counterflow principle, the first decomposition vessel is disconnected from the series after work has proceeded for about 18 hours, and the fresh decomposing solution is allowed to act first in the second vessel. A freshly charged vessel is attached at the end of the series and in this the liquor that is already most laden with $Al_2O_3$ is allowed to act.

*Example 2*

Pre-calcined clay is treated with a current of sulphurous acid as set forth in Example 1, the rate of flow being modified in such a manner that alumina solutions of different concentration are obtained, as shown below:

| Rate of flow, litres per hour | Concentration of liquor in $Al_2O_3$, grms. per litre | $SiO_2$ content per 100 parts of $Al_2O_3$ |
|---|---|---|
| 6 | 10 | 6,0 |
| 3,5 | 22 | 3,67 |
| 2 | 34,6 | 1,83 |
| 0,9 | 51,5 | 1,0 |
| 0,3 | 68,8 | 0,45 |

What we claim is:

1. In the recovery of aluminum values from aluminiferous materials, the process which comprises establishing and maintaining a series of quiescent beds of such a material, passing an aqueous solution of sulfur dioxide through said beds seriatim, at a temperature of about 50 to 80° C. and under pressure, said aqueous solution having a velocity of flow sufficient to prevent the $Al_2O_3$ content from reaching concentrations at which basic aluminum sulfite is precipitated until said solution is about to pass out of said series of quiescent beds, introducing a fresh bed of said material into said series adjacent the exit of said solution and removing a spent bed of said material adjacent the entrance of said solution, then passing said solution in the same direction through the new series of beds.

2. In the recovery of aluminum compounds from aluminiferous materials difficult to decompose, the process which comprises passing a flowing stream of aqueous sulfurous acid through a series of quiescent beds of such a material and maintaining the concentration of $SO_2$, the temperature and the velocity of flow of said solution within such limits that the concentration of $Al_2O_3$ is prevented from reaching the point at which precipitation of basic aluminum sulfite occurs until said solution is about to pass out of said system of quiescent beds.

3. A process for the recovery of aluminum compounds from aluminiferous materials difficult to decompose, which comprises treating a series of quiescent beds of such a material in succession with a stream of aqueous sulphurous acid flowing on the countercurrent principle at a temperature of about 50 to 80° C. and under super-atmospheric pressure, said acid having a velocity of flow sufficient to prevent deposition of basic aluminum sulphite.

4. A process for the recovery of aluminum compounds from aluminiferous materials difficult to decompose, which comprises leaching a series of quiescent beds of such a material by passing therethrough a stream of aqueous sulphurous acid flowing on the countercurrent principle the temperature of said acid gradually falling as it flows from the first of said quiescent beds to the last bed, said acid having a velocity of flow sufficient to prevent deposition of basic aluminum sulphite.

5. A process for the recovery of aluminum compounds from aluminiferous materials difficult to decompose which comprises leaching a bed of such a material by passing therethrough a flowing stream of aqueous sulphurous acid at a temperature of about 50 to 80° C. and under super-atmospheric pressure, said acid having a velocity of flow sufficient to prevent deposition of basic aluminum sulphite, and resaturating the sulphurous acid with sulphur dioxide at an intermediate stage in the process.

6. A process for the recovery of aluminum compounds from aluminiferous materials difficult to decompose, which comprises treating a series of quiescent beds of such a material in succession with a stream of aqueous sulphurous acid flowing on the countercurrent principle at a temperature of about 50 to 80° C. and under super-atmospheric pressure, said acid having a velocity of flow sufficient to prevent deposition of basic aluminum sulphite, and resaturating the sulphurous acid with sulphur dioxide at an intermediate stage in the process.

7. In the recovery of aluminum compounds from aluminiferous materials difficult to decompose, the process which comprises passing a flowing stream of decomposition liquor through at least one quiescent bed of such a material, said decomposition liquor being maintained at a temperature ranging from about 50° to 80° C., containing about 30 to 80 grams of $Al_2O_3$ per liter and a surplus $SO_2$ content of about 15 to 40 parts per 100 parts of water, the velocity of flow of said liquor being maintained at such a point that precipitation of basic aluminum sulfite within said bed is prevented.

WILHELM FULDA.
ERICH WIEDBRAUCK.
KARL BÜCHE.